(12) United States Patent
Tysowski et al.

(10) Patent No.: US 7,613,739 B2
(45) Date of Patent: *Nov. 3, 2009

(54) METHOD AND APPARATUS FOR SYNCHRONIZING DATABASES CONNECTED BY WIRELESS INTERFACE

(75) Inventors: Piotr K. Tysowski, Waterloo (CA); Michael T. Hardy, Waterloo (CA); Barry Linkert, Petersburg (CA)

(73) Assignee: Research In Motion Limited, Waterloo, Ontario (CA)

( * ) Notice: Subject to any disclaimer, the term of this patent is extended or adjusted under 35 U.S.C. 154(b) by 260 days.

This patent is subject to a terminal disclaimer.

(21) Appl. No.: 11/280,173

(22) Filed: Nov. 17, 2005

(65) Prior Publication Data

US 2007/0112882 A1    May 17, 2007

(51) Int. Cl.
*G06F 12/00* (2006.01)
(52) U.S. Cl. .................. 707/201; 707/200; 709/227; 709/228; 709/250
(58) Field of Classification Search ............ 707/1, 707/104.1, 200, 201, 203; 709/248; 713/400
See application file for complete search history.

(56) References Cited

U.S. PATENT DOCUMENTS

| | | | | |
|---|---|---|---|---|
| 5,684,990 A * | 11/1997 | Boothby | ............... | 707/203 |
| 5,974,563 A | 10/1999 | Beeler, Jr. | | |
| 5,995,554 A * | 11/1999 | Lang | ............... | 375/295 |
| 6,061,389 A * | 5/2000 | Ishifuji et al. | ............... | 375/133 |
| 6,212,529 B1 * | 4/2001 | Boothby et al. | ............... | 707/201 |
| 6,272,545 B1 * | 8/2001 | Flanagin et al. | ............... | 709/228 |
| 6,493,709 B1 * | 12/2002 | Aiken | ............... | 707/4 |
| 6,496,835 B2 * | 12/2002 | Liu et al. | ............... | 707/102 |
| 6,662,198 B2 | 12/2003 | Satyanarayanan et al. | | |
| 6,892,221 B2 | 5/2005 | Ricart et al. | | |
| 6,925,477 B1 * | 8/2005 | Champagne et al. | ............... | 707/203 |
| 6,944,782 B2 | 9/2005 | von Mueller et al. | | |
| 6,968,209 B1 * | 11/2005 | Ahlgren et al. | ............... | 455/558 |
| 7,047,367 B2 * | 5/2006 | Nabekura et al. | ............... | 711/147 |
| 7,240,041 B2 * | 7/2007 | Martin et al. | ............... | 706/48 |

(Continued)

FOREIGN PATENT DOCUMENTS

EP    1 522 932 A    4/2005

(Continued)

OTHER PUBLICATIONS

Moon, Timothy, Primary Examiner, "Examination Report" dated May 19, 2008, European Patent Office.

(Continued)

*Primary Examiner*—Apu M Mofiz
*Assistant Examiner*—Jessica N Le
(74) *Attorney, Agent, or Firm*—Perry + Currier Inc.

(57) ABSTRACT

A method of synchronizing at least one database including at least one updated data record with at least one other database including a corresponding data record. The method includes comparing at least one field of data of the updated data record with a corresponding field of the data record prior to updating, generating change information including at least the location of a change and an indication representative of the change for the field of the updated data record, and transmitting the change information for assembly in the corresponding data record.

5 Claims, 6 Drawing Sheets

U.S. PATENT DOCUMENTS

| | | | |
|---|---|---|---|
| 7,317,907 B2 * | 1/2008 | Linkert et al. | 455/412.1 |
| 7,320,061 B2 * | 1/2008 | Yu et al. | 711/170 |
| 7,337,193 B1 * | 2/2008 | Mills et al. | 707/200 |
| 2001/0044805 A1 * | 11/2001 | Multer et al. | 707/201 |
| 2002/0065939 A1 * | 5/2002 | Liu | 709/248 |
| 2002/0118476 A1 * | 8/2002 | Malone, Sr. | 360/48 |
| 2002/0136197 A1 * | 9/2002 | Owen et al. | 370/350 |
| 2003/0037020 A1 * | 2/2003 | Novak et al. | 707/1 |
| 2003/0131025 A1 * | 7/2003 | Zondervan et al. | 707/200 |
| 2003/0159136 A1 * | 8/2003 | Huang et al. | 717/171 |
| 2004/0010628 A1 * | 1/2004 | Gillam et al. | 709/250 |
| 2004/0025072 A1 * | 2/2004 | Mau | 713/400 |
| 2004/0082347 A1 | 4/2004 | Alminana et al. | |
| 2004/0098556 A1 * | 5/2004 | Buxton et al. | 711/201 |
| 2004/0199540 A1 | 10/2004 | Nojima | |
| 2004/0224672 A1 * | 11/2004 | Linkert et al. | 455/414.1 |
| 2004/0248560 A1 | 12/2004 | Bedingfield et al. | |
| 2005/0030229 A1 * | 2/2005 | Spilker | 342/385 |
| 2005/0075097 A1 | 4/2005 | Lehikoinen et al. | |
| 2005/0198084 A1 * | 9/2005 | Kim | 707/204 |
| 2005/0213511 A1 | 9/2005 | Reece, Jr. et al. | |
| 2007/0083676 A1 * | 4/2007 | Rabbers et al. | 709/247 |
| 2007/0226272 A1 * | 9/2007 | Huang et al. | 707/201 |
| 2008/0189425 A1 * | 8/2008 | Green | 709/227 |

FOREIGN PATENT DOCUMENTS

| | | |
|---|---|---|
| GB | 2 366 881 A | 3/2002 |
| WO | 02061706 A1 | 8/2002 |
| WO | 2005041549 A1 | 5/2005 |
| WO | 2005045649 A1 | 5/2005 |
| WO | 2005057233 A2 | 6/2005 |

OTHER PUBLICATIONS

European Search Report of EP 06 79 0863.
European Patent Application No. 06790863.2 Examination Report dated Mar. 31, 2009.

* cited by examiner

METHOD AND APPARATUS FOR SYNCHRONIZING DATABASES CONNECTED BY WIRELESS INTERFACE

FIELD

The present application relates generally to portable electronic devices and more particularly to the synchronizing of data at a portable electronic device with data embodied at a communication network.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, CDMA, EDGE, UMTS AND W-CDMA networks.

These portable electronic devices commonly include databases for storing data that is selectably retrievable by a user of a device. The data forms a series of data records, each data record containing one or more fields. During operation of the device, the data is retrieved and displayed, or otherwise made available to the user. The data can be modified, added to or deleted by the user of the device.

Advances in data storage have accompanied advances in portable electronic devices, to provide for back-up of data stored at the electronic device. By backing-up the device, data can be recovered in the event of data loss at the electronic device. Various electronic devices are backed-up by way of communication over a fixed (wire) connection between the electronic device and, for example, a computing station such as a desktop computer. Once the data is stored in a database at the computing station, the stored data can be modified, added to or deleted by a user at the computing station.

Other portable electronic devices provide for back-up of data stored thereon, to a computing station by way of a radio interface, using, for example, the networks listed above. Thus, data is sent over a radio communication channel of a radio communication system, thereby forming a communications link between the portable electronic device and a remote station (a station not linked by wire communication). Again, once the data is stored in a database at a computing station, the stored data can be modified, added to or deleted at the computing station. Thus, while data stored in the database of the portable electronic device is backed-up to a computing station, data is also transmitted from the computing station to the portable electronic device to synchronize the databases of the portable electronic device with the databases of the computing station. When a data record on a computing station does not exist on the portable electronic device, or when the content of the data record (the fields of the data record) of the computing station differs from the content of the data record of the portable electronic device, then the additional data record or differing data record is transferred to the portable electronic device. Similarly, when a data record on a portable electronic device does not exist on the computing station, or when the content of the data record of the portable electronic device differs from the content of the data record of the computing station, the additional data record or differing data record is transferred to the computing station.

Data synchronization over a radio communication channel is clearly advantageous as data can be communicated remotely over large distances. Conventional manners of data synchronization over radio communication channels suffer disadvantages, however. Such data synchronization can be prohibitively bandwidth consumptive. If many records are transferred, the transfer time can be extensive meaning that a communication channel is opened for a long period of time to transfer the data records, which can be costly for the user.

Improvements in synchronizing databases connected by wireless interface are therefore desirable.

BRIEF DESCRIPTION OF THE DRAWINGS

The method and apparatus for synchronizing databases connected by wireless interface will be better understood with reference to the following description and to the Figures, in which.

DETAILED DESCRIPTION OF THE EMBODIMENTS

Figure 1:
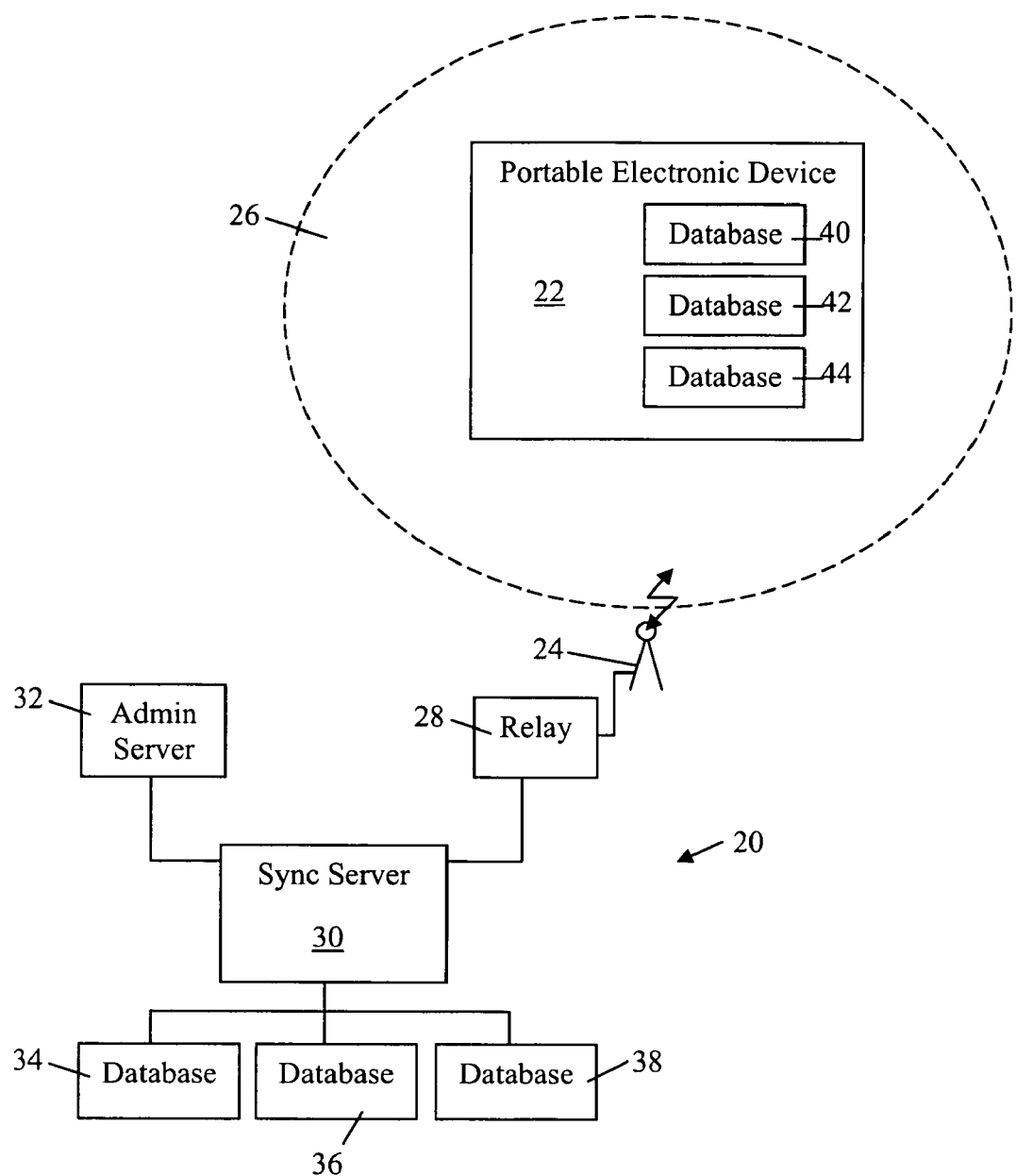
FIG. 1 is a functional block diagram of a radio communication system and portable electronic device.

Reference is first made to FIG. 1 which shows a functional block diagram of a radio communication system indicated generally by the numeral 20 and a portable electronic device 22. The radio communication system 20 provides for communications with portable electronic devices including the exemplary portable electronic device 22, as shown. The portable electronic device 22 and the radio communication system 20 are operable to effect communications over a radio communications channel therebetween. Data originating at the portable electronic device 22 is communicated to the radio communication system 20 by way of the radio communications channel. Similarly, data originating at the communication system 20 is communicated from the radio communication system 20 to the portable electronic device 22 by way of the radio communications channel, thereby providing data to the portable electronic device 22.

For the purposes of illustration, the communications system is functionally represented in FIG. 1 and a single base station 24 is shown. The base station 24 defines a coverage area, or cell 26 within which communications between the base station 24 and the portable electronic device 22 can be effected. It will be appreciated that the portable electronic device 22 is movable within the cell 26 and can be moved to coverage areas defined by other cells that are not illustrated in the present example. The communication system 20 includes a relay device 28 that is connected to the base station 24 and a synchronization server 30. It will be understood that the functions provided by the relay device 28 and the synchronization server 30 can be embodied in the same device. The synchronization server 30 is connected to an administration server 32, as shown. The administration server 32 provides administrative services to the communications system 20 and, for instance, provides administrative control over the synchronization server 30.

The synchronization server 30 is functionally coupled to databases, of which, three exemplary database types including a first database 34, a second database 36 and a third database 38, are shown. The databases of the present example are of a text format such as an Extensible Mark up Language (XML) format. The data maintained in the first, second and third databases 34, 36, 38, includes a number of data records, each data record containing a plurality of fields that are populated with data. Particular ones of the fields of each data record that are populated are key fields that are sufficient to uniquely identify the data record in which they are contained.

The portable electronic device 22, of which only particular functional portions are shown in FIG. 1 for the purposes of the present description, includes a plurality of databases 40, 42, 44 that correspond to the first, second and third databases 34, 36, 38, respectively, of the communication system 20. The databases 34, 36, 38 and the databases 40, 42, 44, can be selectably altered in an asymmetrical manner such that the databases 34, 36, 38 of the communication system 20 do not match the databases 40, 42, 44 of the portable electronic device 22. In other words, any or all of the databases 34, 36, 38, 40, 42, 44 can be altered by adding records, deleting records and modifying fields of the records by adding, deleting or modifying the data populating those fields.

Figure 2:
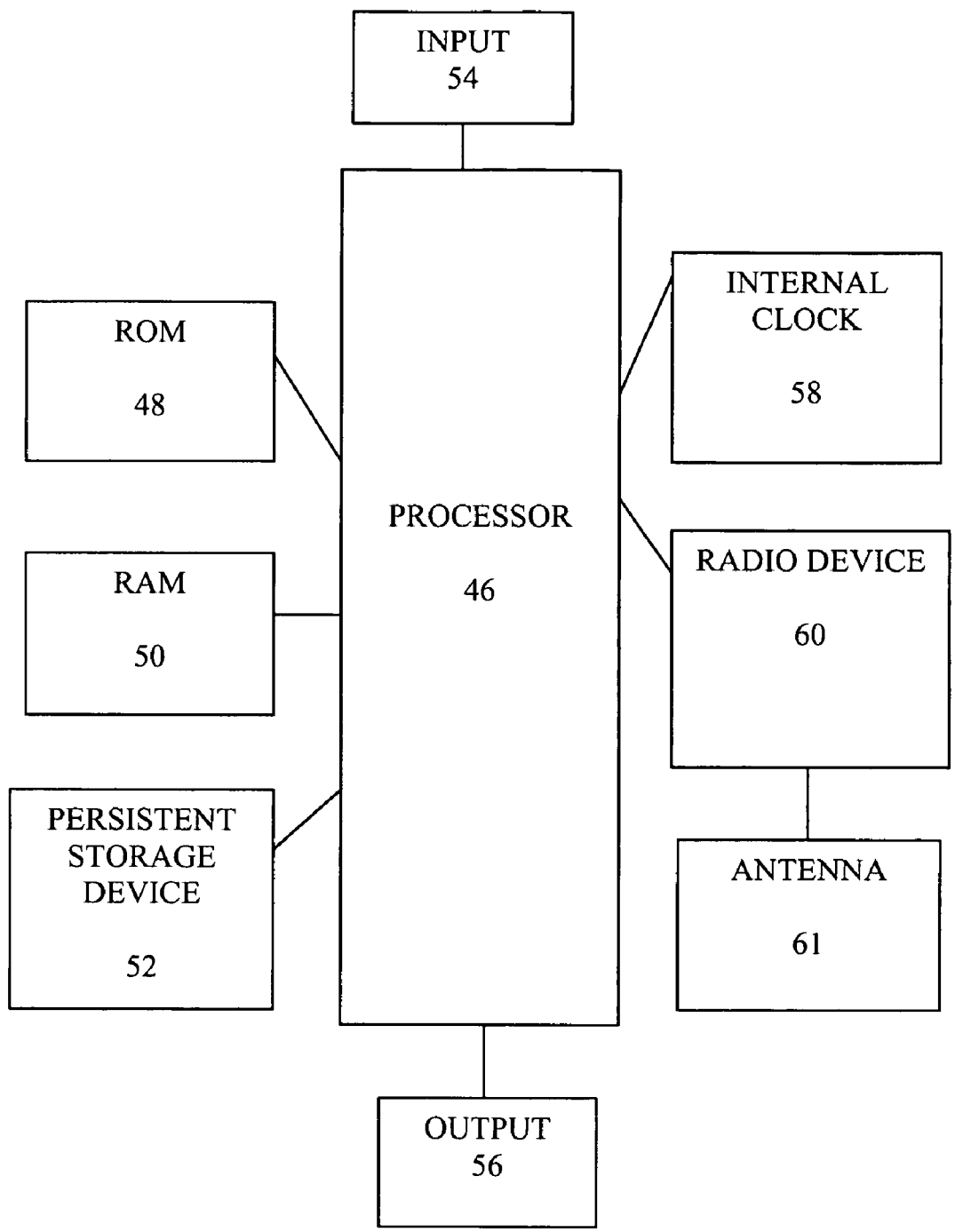
FIG. 2 is a block diagram of certain internal components within the portable electronic device.

Reference is now made to FIG. 2 which shows a block diagram of certain internal components within the portable electronic device 22. The portable electronic device 22 is based on a microcomputer that includes a processor 46 connected to a read-only-memory (ROM) 48 that contains a plurality of applications executable by the processor 46 to enable the portable electronic device 22 to perform certain functions including synchronization with the communication system 20. The processor 46 is also connected to a random access memory unit (RAM) 50 and a persistent storage device 52 which are responsible for various non-volatile storage functions of the portable electronic device 22 and in which the databases 40, 42, 44 are maintained. The processor 46 receives input from input devices 54 such as a keyboard. The processor 46 outputs to output devices 56 such as an LCD display. The processor 36 is also connected to an internal clock 58 and a radio device 60 which in turn is connected to an antenna 61. Together the radio device 60 and the antenna 61 are used to connect to the radio communication system 20 over a radio communications channel. Thus, the portable electronic device 22 is operable to receive and transmit communication signals containing data that is communicated to and from the communication system 20 via the radio device 60 and the antenna 61.

It will be understood that the functions described herein can be carried out in any suitable manner. In the present example, the functions are carried out by algorithms executable by the processor 46 in a synchronization application. For example, the processor 46 of the portable electronic device 22 is operable to perform hash functions by retrieving the data from one or more of the databases 40, 42, 44 of the persistent storage device 52 and generating a hash, thereby placing the accessed data in short-digest form. Hash functions performed by the processor 46 include, for example, computation of check sums as well as other hash function computations. The processor 46 is further operable to provide the generated hash to the radio device 60 for transmission from the portable electronic device 22 to the radio communication system 20 over the radio communications channel. Hash generation is triggered either by an input from the input device 54 or by a signal received from communication system 20.

The microcomputer of the portable electronic device 22 is operable to receive communications from the communication system 20. For example, the microcomputer is operable to receive a request for additional hash information and in response, to provide additional hash information by retrieving data from one or more of the databases 40, 42, 44, performing hash functions on the data, thereby generating an additional hash and transmitting the additional hash to the communication system 20. The microcomputer is further operable to receive a request from the communication system 20, for information relating to additions, deletions and changes or updates made to data records. The microcomputer maintains change history data on the persistent storage device 52 for each data record of each respective database 40, 42, 44, including information relating to changes made to the data records since a last synchronization with the communication system 20. The change history data includes an identifier for each data record along with an indication of the type of change including indications of added records, deleted records and updated records and is updated each time a change is made to one of the records stored on one of the databases 40, 42, 44. In response to receipt of the request for information, the change history data is retrieved from the persistent storage device 52 and using the change history data to identify the data records, the microcomputer is operable to compare fields of data for updated records with the corresponding fields of data of the records at last synchronization (prior to the update) and determine byte differences between the two. From the comparison of fields of data for updated records with the corresponding fields of data of the records at last synchronization, the microcomputer is operable to generate byte change information for each field of data in which changes are indicated. The byte change information includes, for each change, the byte position, the length of data, and for additions or replacement of data, the actual data added. The microcomputer is still further operable to encode more than one byte change as a single change by generating a single position and length of data for more than one byte change, in which byte changes are determined to be separated by less than a minimum number of bytes. The size of the byte change information is compared to the total size of the field of data and based on this comparison the microcomputer is operable to make a determination whether to transmit byte change information or the full field of data to the communication system 20. Further still, the microcomputer is operable to transmit the data to the communication system 20.

The microcomputer is also operable to receive data transmitted from the communication system 20 and to write the data by adding the data to one or more of the databases 40, 42, 44 or by overwriting data on one or more of the databases 40, 42, 44, maintained on the persistent storage device 52.

Figure 3:
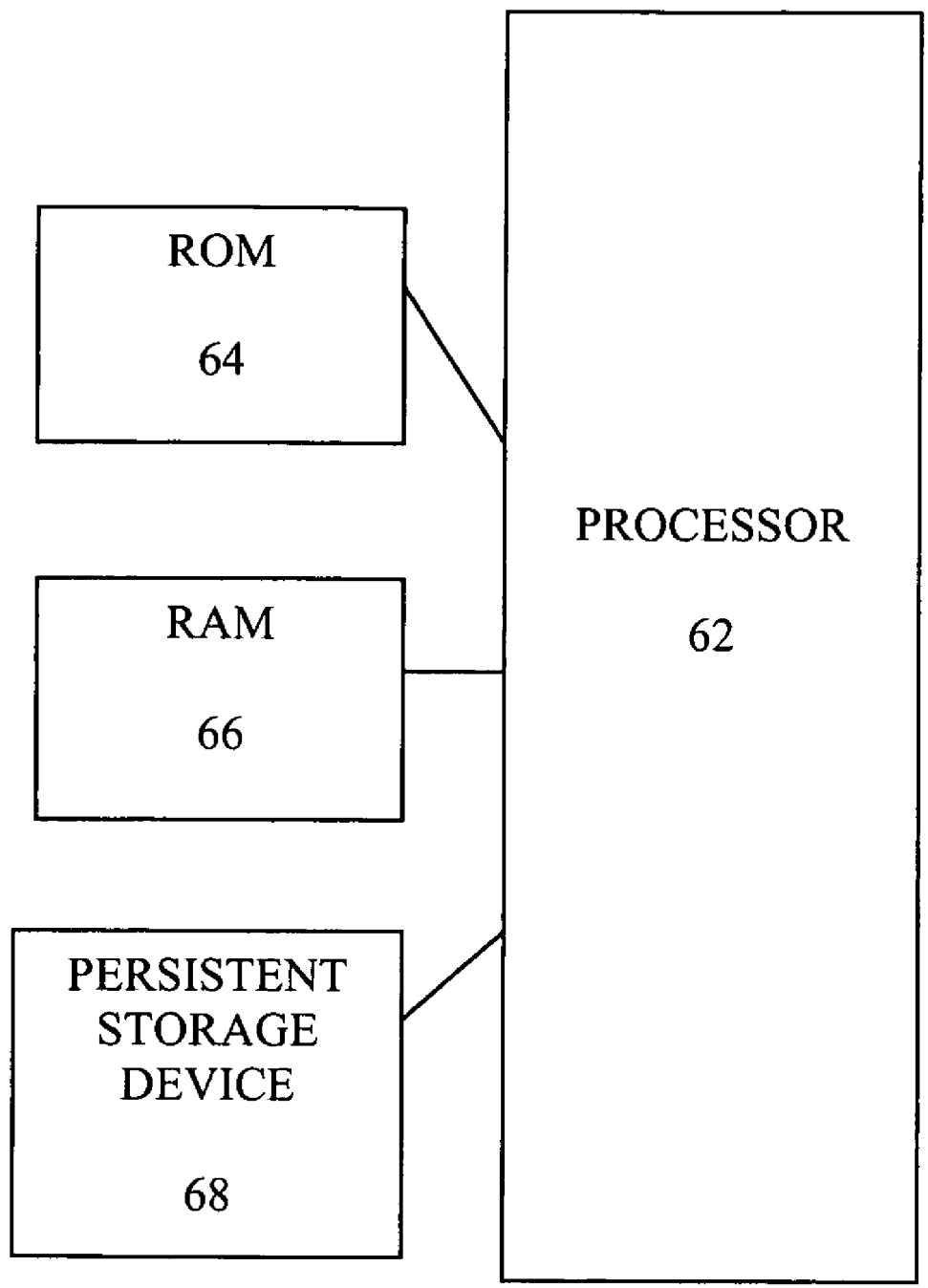
FIG. 3 is a block diagram of certain internal components within a synchronization server.

Reference is now made to FIG. 3 which shows a block diagram of certain internal components within the synchronization server 30. Similar to the portable electronic device 22, the synchronization server 30 includes a processor 62 connected to a read only memory (ROM) 64 that includes applications executable by the processor 62 and enables the synchronization server 30 to perform certain functions including synchronization with the portable electronic device 22. The processor 62 is also connected to a random access memory unit (RAM) 66 and a persistent storage device 68 which are responsible for various non-volatile storage functions of the synchronization server 30. The processor 62 is connected to the databases 34, 36, 38 and to the relay device 28, which in turn is connected to the base station 24 for connecting to the portable electronic device 22 over a radio communications channel. Thus, the synchronization server 30 is operable to receive and transmit communication signals containing data that is communicated to and from the portable electronic device 22 via the relay device 28 and the base station 24.

Again, it will be understood that the functions described herein can be carried out in any suitable manner. In the present example, the functions are carried out by algorithms executable by the processor 62. For example, the processor 62 of the synchronization server 30 is operable to perform hash functions by retrieving the data from one or more of the databases 34, 36, 38 and generating a hash, thereby placing the accessed data in short-digest form. The processor 62 is further operable to provide the generated hash to the relay device 28 for transmission to the portable electronic device 22.

The synchronization server 30 is operable to receive communications generated by the portable electronic device 22 relating to synchronization. For example, the synchronization server 30 is operable to receive the hash generated by the portable electronic device 22 and, in response, to compare the hash information from this hash to the hash information from the locally generated hash generated by the synchronization server 30. The synchronization server 30 is also operable to generate and transmit a request for additional information from the portable electronic device 22, based on and in response to results of the comparison of the hash information from the hash generated by the portable electronic device 22 with the hash information from the locally generated hash. The request for additional information is provided to the relay 28 and, through the base station 24, is transmitted to the portable electronic device 22. The request for additional information can be a request for additional hash information or a request for data records, depending on the results of the comparison of the hash information from the hash generated by the portable electronic device 22 with the hash information from the locally generated hash. Further, the synchronization server 30 is operable to receive data transmitted from the portable electronic device 22 (through the base station 24 and relay device 28), determine the type of data received, and write the data by adding the data to one or more of the databases 34, 36, 38 or overwriting the data on one or more of the databases 34, 36, 38. Further still, the synchronization server 30 stores synchronization history data in the persistent storage device 68, thereby maintaining a listing of changes made to the databases 34, 36, 38 connected to the synchronization server 30 and to the databases 40, 42, 44 of the portable electronic device 22. The synchronization server 30 accesses the synchronization history data during synchronization operations to reduce the data communicated between the communication system 20 and the portable electronic device 22 in subsequent synchronizations by determining previously synchronized data.

The synchronization server 30 is further operable to receive byte change information and entire field data for each data record for which changes made on the portable electronic device 20 are not reflected in the data record stored on the respective one of the databases 34, 36, 38. The corresponding data record is retrieved from the respective ones of the databases 34, 36, 38 and the data record is updated by reassembling the fields of data, replacing entire fields of data with new fields of data received from the portable electronic device 22 and assembling updated data fields when byte change information is received. The synchronization server 30 stores each updated data record by overwriting the updated data record on the data record of the respective database 34, 36, 38.

Figure 4:
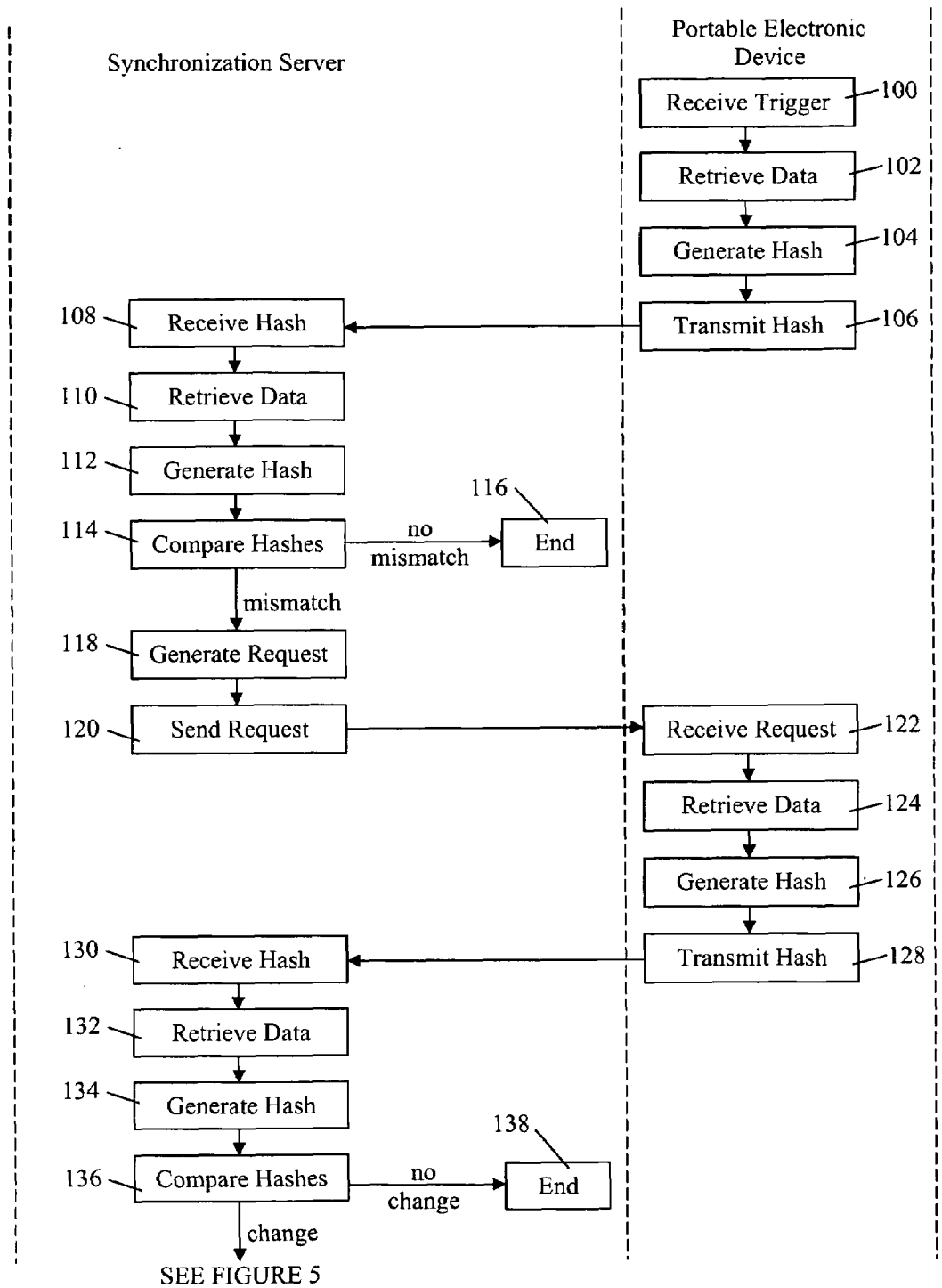
FIG. 4 is a sequence diagram illustrating functions carried out at both the portable electronic device and the communication system during synchronization of databases connected by wireless interface.

Reference is now made to FIG. 4, which shows a sequence diagram illustrating functions carried out at both the portable electronic device 22 and the communication system 20 during synchronization of databases connected by wireless interface, in accordance with one embodiment of the present application. Coding of software for carrying out such steps is well within the scope of a person of ordinary skill in the art. First, the portable electronic device 22 receives a synchronization trigger at 100, from, for example, a user input on the input device 54. Alternatively, the portable electronic device 22 receives a synchronization trigger from the communication system 20. In response to receipt of the synchronization trigger, data is retrieved from the databases 40, 42, 44 at step 102 and the processor 46 generates a hash for each database 40, 42, 44 at step 104. After generation of each hash, each hash is transmitted at step 106 to the communication system 20 over a radio communication channel.

The communication system 20 receives each hash at step 108 by receipt at the base station 24 and forwards the hashes on to the synchronization server 30. In response to receipt of each hash from the portable electronic device 22, data is retrieved from the databases 34, 36, 38 at step 110 and the processor 62 of the synchronization server 30 generates a hash for each respective database (referred to herein as the locally generated hash) at step 112. After generation of each locally generated hash, the hash information of each hash received from the portable electronic device 22 is compared with the hash information of the corresponding locally generated hash at step 114. If the comparison of the hash information indicates that the databases 40, 42, 44 of the portable electronic device 22 are not in mismatch with the respective databases 34, 36, 38 of the communication system 20, then the synchronization process ends at step 116. If, however, the comparison of the hash information indicates that any one of the databases 40, 42, 44 of the portable electronic device 22 are in mismatch with the respective databases, 34, 36, 38 of the communication system 20, then at least one of the databases is to be updated and a request for additional hash information is generated by the synchronization server 30 at step 118. The request for additional hash information is a request for hash information associated with data records. The additional hash information is requested for each data record of a particular database of the portable electronic device 22 that is determined to be mismatched with the corresponding database of the communication system 20. After generation of the request for additional hash information, the request is then transmitted at step 120 to the portable electronic device 22.

Once the request for additional hash information is received at the portable electronic device 22 at step 122, data is retrieved from one or more of the databases 34, 36, 38 at step 124, in accordance with the request for additional hash information. An additional hash is then generated at step 126 for each of the data records of the respective database, and each hash is transmitted at step 128 to the communication system 20 over the radio communication channel.

The additional hash information is received at the communication system 20 and delivered to the synchronization server 30 at step 130. In response to receipt of the requested additional hash information, additional data is retrieved from one or more of the corresponding databases 34, 36, 38 at step 132 and an additional hash (referred to as the additional locally generated hash) is generated for each of the corresponding data records of the respective database at step 134. After generation of each additional locally generated hash, the additional hash information received from the portable electronic device 22 is compared with the additional hash information from each additional locally generated hash at step 136 and a determination is made as to whether the data, of which the additional hash information is representative, has changed. If it is determined that this data has not changed, the synchronization process ends for each data record for which the data has not changed at step 138. If, however, it is determined that this data has changed, the comparison at step 136 also determines where the change was made (i.e. at the communication system 20 side or at the portable electronic device 22 side). Thus, changes have been made to the data records at one of the portable electronic device 22 and the communication system 20 that are not reflected at the other. If it is determined that the data has changed at step 136, the databases are synchronized by updating the databases at communication system 20 or the portable electronic device 22 or databases at both the communication system 20 and the portable electronic device 22 that are determined to be mismatched. With the determination of a mismatch, a conflict resolution policy is run, thereby determining how the mismatched records are to be updated (i.e. whether to update the database records on the portable electronic device 22 with the database records of the synchronization server 30 or vice versa).

Figure 5:
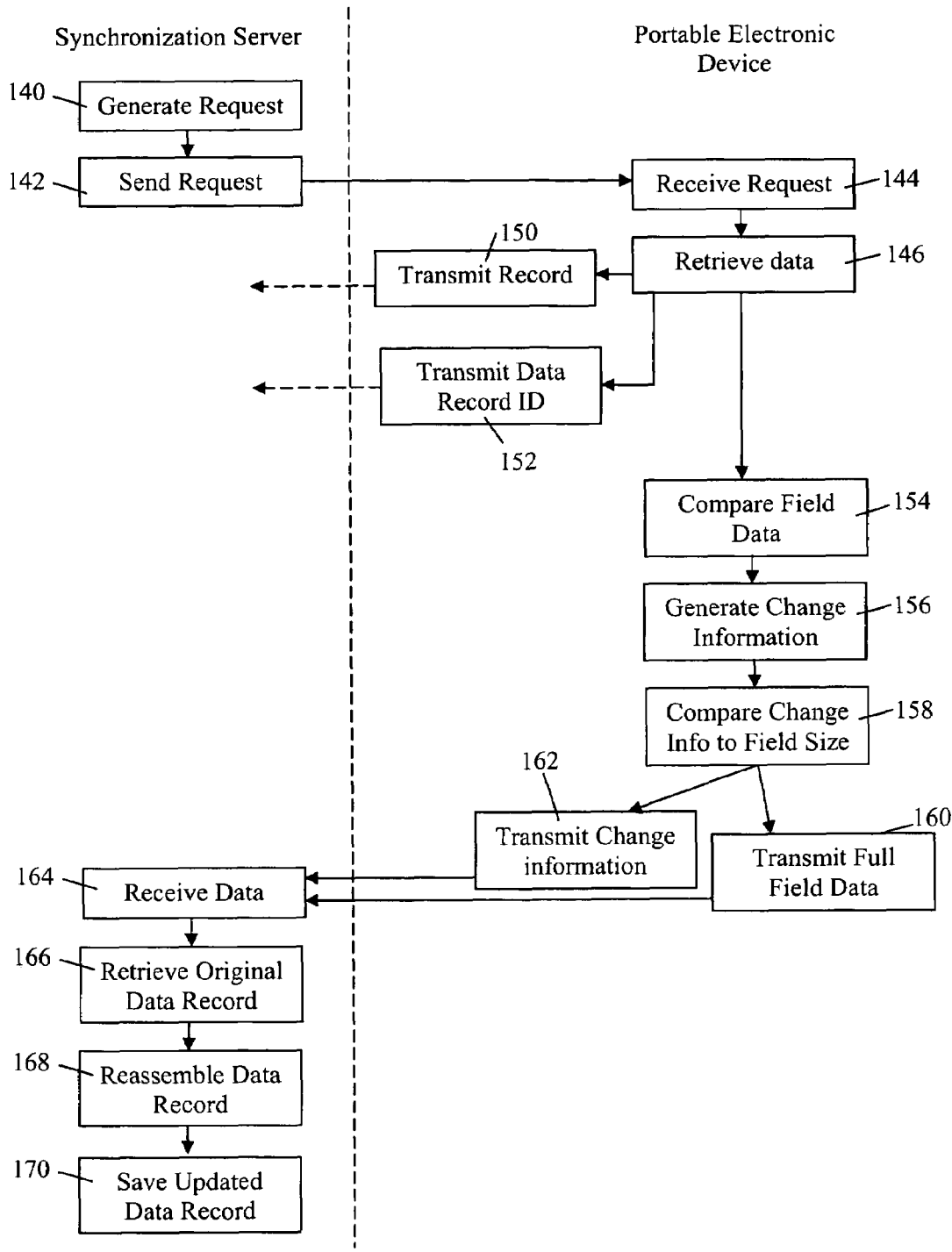
FIG. 5 is a sequence diagram illustrating functions carried out at both the portable electronic device and the communication system during updating of databases at the communication system.

Referring now to FIG. 5, there is shown a sequence diagram illustrating functions carried out at both the portable electronic device 22 and the communication system 20 during updating of the databases 34, 36, 38 of the communication system 20. Again, coding of software for carrying out such steps is well within the scope of a person of ordinary skill in the art. If it is determined at step 136 that additional data records or changes to data records at the portable electronic device 22 are not yet reflected at the communication system 20, a fetch request is generated by the synchronization server 30 as shown at step 140. After generation of the fetch request, the fetch request is transmitted to the portable electronic device 22 at step 142, thereby requesting information relating to additions, deletions and changes made to data records on the portable electronic device 22 that are not reflected on the databases 34, 36, 38 at the communication system 20.

The fetch request is then received at the portable electronic device 22 at step 144 and the requested data records are retrieved from the respective database 40, 42, 44 at step 146. For those records that are determined to have been added at step 136, the entire data record is transmitted from the portable electronic device 22 to the communication system 20 at step 150. For those records that are determined to have been deleted at step 136, an indication that these records have been deleted is sent from the portable electronic device 22 to the communication system 20 at step 152. It will be appreciated that a record identifier is sent to identify each record for deletion.

For each of those records that are determined to have been updated on the portable electronic device 22 at step 136, each field of data for the updated record is compared with the corresponding field of data of the record as last synchronized (step 154). The byte differences between the field data of the updated record and the field data of the record at last synchronization are compared. The position of each byte change and the length of the change is determined based on the comparison. Each byte change is thereby indexed by position and the length of each index position is determined. For example, an insertion of three characters into a field of data at a byte position of 50 is determined to consist of a byte position (50) and a length of data (3). Conversely, deletion of characters are signified by a negative length value. Thus, deletion of three characters into a field of data at a byte position of 50 is determined to consist of a byte position (50) and a length of data (−3). Replacement of characters is signified by a deletion followed by an addition. For example, replacement of two characters with two different characters at a byte position of 50 are determined to consist of a byte position (50) and a length of data (−2), followed by a byte position (50) and a length of data (2). It will be understood that each indexed byte position is based on the byte positions of the field of data of the record as last synchronized. Byte change information is thereby generated, encoding the byte position, length of data and, for character additions or replacement, the actual new data at step 156. During generation of the byte change information, any changes within the field of data that are separated by less than a minimum threshold number of bytes, are signified as a single change. Thus, where two changes are separated in position by fewer bytes than are required for encoding the position and length of the second change, the two changes are treated as a single change to reduce byte change data that is transmitted to the communication system 20. The total size of all byte change data for a single field that is generated at step 156 is then compared to the total size of the field of data at step 158. If the total size of the full field data is less than or equal to the total size of all byte change data for a single field, the full field data is transmitted to the communication system 20 at step 160. If, however, the total size of the full field data is greater than the total size of all byte change data for a single field, the byte change information is transmitted to the communication system 20 at step 162. Thus, the byte change information is transmitted rather than the full field data if the byte change information is smaller in size than the full field data, thereby reducing the amount of data transmitted.

Either of the byte change information or the full field data is received at the communication system 20, depending on which one is transmitted (step 164). Upon receipt of the byte change information or full field data at the for each data record, the corresponding data record as previously synchronized is retrieved from the appropriate database on which the data record resides, at step 166. At step 168, the fields of the data record are reassembled by replacing entire fields of data, when entire fields of data are received and assembling updated data fields when byte change information is received. If a data field of a data record stored in a database at the communication system 20 includes changes that are not yet reflected in the corresponding data field of a data record stored in a database at the portable electronic device 22, the synchronization server 30 may request full field data content depending on the conflict resolution policy. After reassembly of each of the fields of the data record, the updated data record is saved to the respective one of the databases 34, 36, 38 of the communication system 20 by overwriting the updated data record on the previously saved version of the data record (step 170).

Although not shown in FIG. 5, it will be understood that in response to receipt of entire data records that are determined to be added to the portable electronic device 22 at step 136 and transmitted from the portable electronic device 22 at step 150, the respective ones of the databases 34, 36, 38 of the communication system 20 are updated by writing new data records in the respective databases 34, 36, 38. It will also be understood that in response to receipt of the indication that identified data records have been deleted from the portable electronic device 148, the respective ones of the databases 34, 36, 38 of the communication system 20 are updated by deleting the corresponding data records in the respective databases 34, 36, 38.

Figure 6:
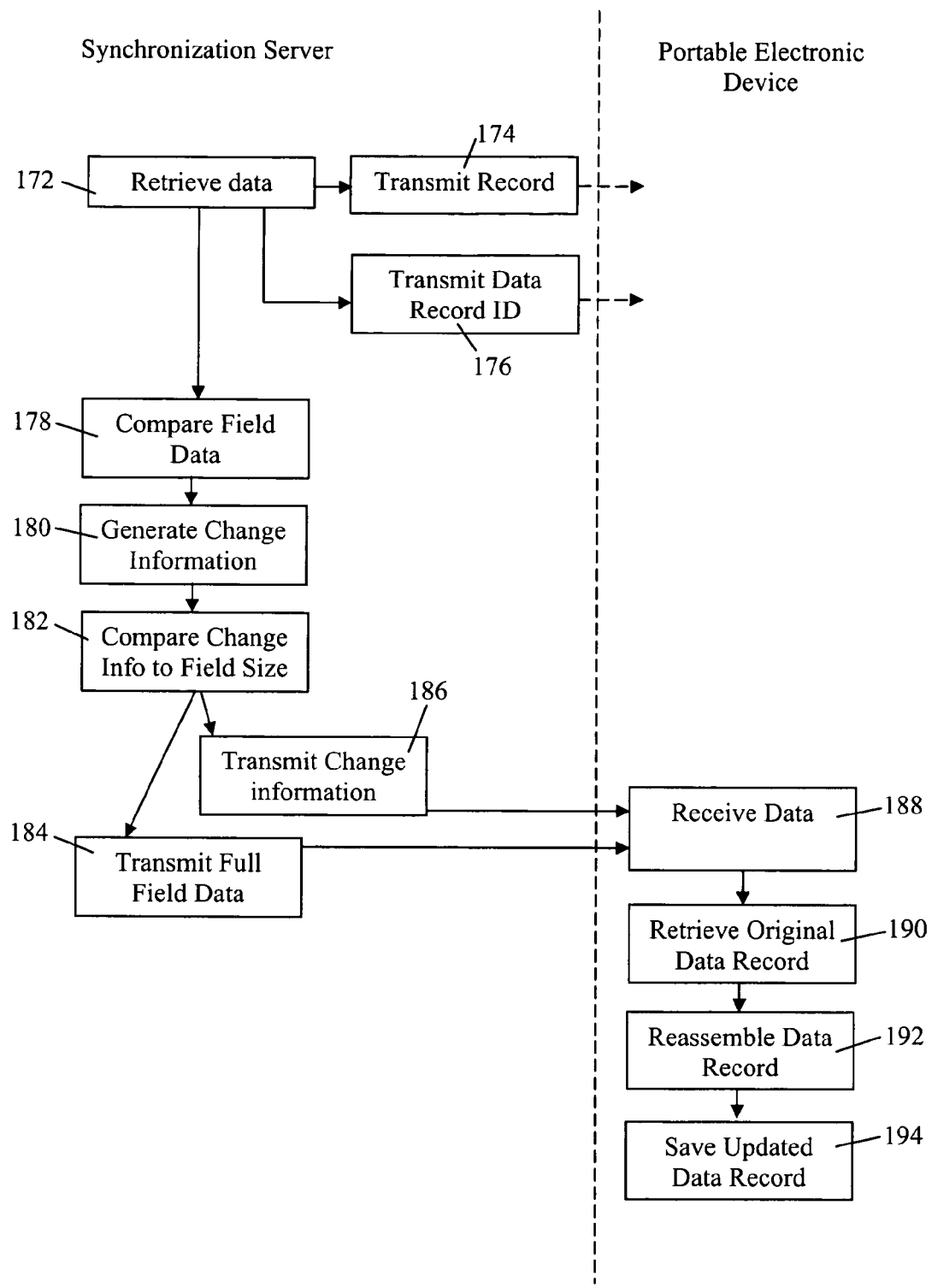
FIG. 6 is a sequence diagram illustrating functions carried out at both the portable electronic device and the communication system during updating of databases at the portable electronic device.

Referring now to FIG. 6, there is shown a sequence diagram illustrating functions carried out at both the portable electronic device 22 and the communication system 20 during updating of the databases 40, 42, 44 of the portable electronic device 20. Again, coding of software for carrying out such steps is well within the scope of a person of ordinary skill in the art. If it is determined at step 136 that additional data records or changes to data records at the communication system 20 are not yet reflected at the portable electronic device 22, the additional or changed data records are retrieved at step 172. For those records that are determined at step 136 to have been added to the communication system 20 and that are not yet present at the portable electronic device 22, the entire data record is transmitted from the communication system 20 to the portable electronic device 22 at step 174. For those records that are determined to have been deleted at step 136, an indication that these records have been deleted is sent from the communication system 20 to the portable electronic device 22 at step 176. It will be appreciated that a record identifier is sent to identify each record for deletion. For each of those records that are determined to have been updated communication system 20, the field data is compared at step 178 and byte change information is generated, as described above, encoding the byte position, length of data and, for character additions or replacement, the actual new data, at step 180. As described above, the total size of all byte change data for a single field that is generated at step 180 is then compared to the total size of the field of data at step 182 to determine whether to transmit the full field data at step 184 or to transmit the byte change information at step 186.

Either of the byte change information or the full field data is received at the portable electronic device 22, depending on which one is transmitted (step 188). Upon receipt of the byte change information or full field data at the for each data record, the corresponding data record as previously synchronized is retrieved from the appropriate database on which the data record resides, at step 190. At step 192, the fields of the data record are reassembled by replacing entire fields of data, when entire fields of data are received and assembling updated data fields when byte change information is received. After reassembly of each of the fields of the data record, the updated data record is saved to the respective one of the databases 40, 42, 44 of the communication system 20 by overwriting the updated data record on the previously saved version of the data record (step 194).

Although not shown in FIG. 6, it will be understood that in response to receipt of entire data records that are determined to be added to the databases 34, 36, 38 at the communication system 20 at step 136 and transmitted from the communication system 20 at step 174, the databases 40, 42, 44 of the portable electronic device 22 are updated by writing new data records in the respective databases 40, 42, 44. It will also be understood that in response to receipt of the indication that identified data records have been deleted from the communication system 22 the respective ones of the databases 40, 42, 44 of the portable electronic device 22 are updated by deleting the corresponding data records in the respective databases 40, 42, 44.

While the embodiment described herein is directed to a particular implementation of the method and apparatus for synchronizing databases connected by wireless interface, it will be understood that modifications and variations to this embodiment are within the sphere and scope of the present application. For example, while the byte change information generated at step 156 is described as including a byte position and length of data for each change and the new data for additions, it is contemplated that the byte change information can include a change type, such as ADD, REPLACE or DELETE. Also, in the above-described embodiment, the total size of all byte change data for a single field that is generated at step 156 is compared to the total size of the field of data at step 158. The total size of the field of data thereby acts as a threshold to determine whether to send the full field data or byte change information. It is contemplated, however, that other thresholds can be used. For example, a threshold number of changes can be used such that if the number of changes exceeds this threshold, the entire field is transmitted rather than the byte change information.

Other modifications and variations are possible. For example, it will be understood that the portable electronic device 22 is not limited to three databases as any suitable number of databases is possible. Similarly, the communication system 20 may include any suitable number of databases. Also, although byte change information is transferred for certain data records, it is contemplated that the data records can be transmitted in full during, for example, future synchronization over wire connections, for example. It will also be understood that the steps described hereinabove are not limited to the order in which they are described. For example, certain steps can occur simultaneously while other steps can occur, for example, prior to synchronization.

Many other modifications and variations may occur to those skilled in the art. All such modifications and variations are believed to be within the sphere and scope of the present application.

What is claimed is:

1. A method of synchronizing at least one database of a first apparatus, said at least one database including at least one updated data record, with at least one other database of a second apparatus including a corresponding data record, the method implemented in the first apparatus, the method comprising:

comparing byte information of at least one updated field of data of the updated data record with last synchronized byte information of a corresponding field of said corresponding data record;

generating byte change information including:

at least a location of a data change in said updated field, represented by a byte index position;

an indication representative of data change for said updated field of the updated data record, said indication representative of data change comprising:

a length value of data; and if said data change comprises an addition or replacement of data in said updated field, new data representative of said data change, wherein when said byte change information includes information relating to a plurality of data changes in said updated field and two of said plurality of data changes are separated in byte position by fewer than a threshold number of bytes, said at least a location of a data change includes a single location of data change for said two data changes and said byte change information includes an indication representative of both said two data changes;

comparing a size of said byte change information to a total size of said updated field; and if said byte change information is smaller than said total size, transmitting said byte change information, to said second apparatus, for assembly in said corresponding data record, otherwise transmitting said updated field, to said second apparatus, for assembly in said corresponding data record.

2. The method according to claim 1, wherein if said data change comprises a deletion of data, then said indication representative of data change further comprises a negative length value representative of a number of bytes deleted in said data change.

3. An apparatus for synchronizing at least one database including at least one updated data record with at least one other database including a corresponding data record, the apparatus comprising:
- a memory device for storing said at least one database including said at least one updated data record; and
- a processor operably coupled to said memory device and to a transmitting and receiving device, for comparing byte information of at least one updated field of data of the updated data record with last synchronized byte information of a corresponding field of said corresponding data record,
- generating byte change information including:
- at least a location of a data change in said at least one updated field, represented by a byte index position;
- an indication representative of data change for said updated field of the updated data record, said indication representative of data change comprising:
  - a length value of data; and
  - if said data change comprises an addition or replacement of data in said updated field, new data representative of said data change,
- wherein when said byte change information includes information relating to a plurality of data changes in said at least one updated field and two of said plurality of data changes are separated in byte position by fewer than a threshold number of bytes, said at least a location of data change includes a single location of data change for said two data changes and said byte change information includes an indication representative of both said two data changes, comparing a size of said byte change information to a total size of said updated field, and if said byte change information is smaller than said total size, transmitting said byte change information for assembly in said corresponding data record, otherwise transmitting said updated field for assembly in said corresponding data record.

4. The apparatus according to claim 3, wherein if said data change comprises a deletion of data, then said indication representative of data change further comprises a negative length value representative of a number of bytes deleted in said data change.

5. A computer-readable storage medium having computer readable code embodied therein for:
- comparing byte information of at least one updated field of data of the updated data record with last synchronized byte information of a corresponding field of said corresponding data;
- generating byte change information including:
  - at least a location of a data change in said at least one updated field, represented by a byte index position; and
- an indication representative of data change for said updated field of the updated data record, said indication representative of data change comprising:
  - a length value of data: and
  - if said data change comprises an addition or replacement of data in said updated field, new data representative of said data change,
- wherein when said byte change information includes information relating to a plurality of data changes in said at least one updated field and two of said plurality of data changes are separated in byte position by fewer than a threshold number of bytes, said at least a location of data changes includes a single location of data change for said two data changes and said byte change information includes an indication representative of both said two data changes;
- comparing a size of said byte change information to a total size of said updated field; and
- if said byte change information is smaller than said total size, transmitting said byte change information for assembly in said corresponding data record, otherwise transmitting said updated field for assembly in said corresponding data record.

* * * * *

UNITED STATES PATENT AND TRADEMARK OFFICE
CERTIFICATE OF CORRECTION

PATENT NO. : 7,613,739 B2 Page 1 of 1
APPLICATION NO. : 11/280173
DATED : November 3, 2009
INVENTOR(S) : Tysowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 310 days.

Signed and Sealed this

Nineteenth Day of October, 2010

David J. Kappos
*Director of the United States Patent and Trademark Office*